(12) United States Patent
Lam

(10) Patent No.: US 7,190,495 B2
(45) Date of Patent: Mar. 13, 2007

(54) MULTIPLIED RESOLUTION SCANNER

(75) Inventor: Kai Y. Lam, Torrance, CA (US)

(73) Assignee: Microtek International, Inc., Hsinchu (TW)

( * ) Notice: Subject to any disclaimer, the term of this patent is extended or adjusted under 35 U.S.C. 154(b) by 888 days.

(21) Appl. No.: 10/304,498

(22) Filed: Nov. 26, 2002

(65) Prior Publication Data

US 2004/0100662 A1   May 27, 2004

(51) Int. Cl.
*H04N 1/04* (2006.01)

(52) U.S. Cl. .................. 358/474; 358/486; 358/497; 358/483

(58) Field of Classification Search ................ 358/474, 358/475, 497, 494, 486, 483, 512–514, 505; 382/312, 318, 319; 250/234–236, 208.1, 250/211, 212; 399/211, 212
See application file for complete search history.

(56) References Cited

U.S. PATENT DOCUMENTS

| 6,147,780 | A  | * | 11/2000 | Chiang ........................ 358/497 |
| 6,603,581 | B2 | * | 8/2003  | Lam et al. ................... 358/474 |
| 6,707,583 | B1 | * | 3/2004  | Tsai et al. .................... 358/497 |
| 6,724,505 | B2 | * | 4/2004  | Lin ............................. 358/497 |
| 6,762,862 | B2 | * | 7/2004  | Lam et al. ................... 358/482 |

\* cited by examiner

*Primary Examiner*—Cheukfan Lee
(74) *Attorney, Agent, or Firm*—Lewis Brisbois Bisgaard & Smith LLP; Jon E. Hokanson

(57) ABSTRACT

A multiplied resolution, single pass flatbed scanner having a charge-coupled device (CCD) sensor of n pixels with a scan width of W, which gives a subject pixel center to center distance of W/n, two independently moveable carriages capable of incremental advancement of W/2n so that for each read of a scan line Y, two reads of all segments of X along the scan line of Y are taken, with each segment of X having a width of half pixel distance, W/2n, and each line Y having a height of half pixel distance, W/2n, to thereby double the resolution.

3 Claims, 8 Drawing Sheets

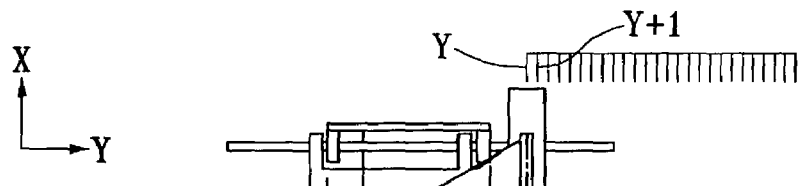

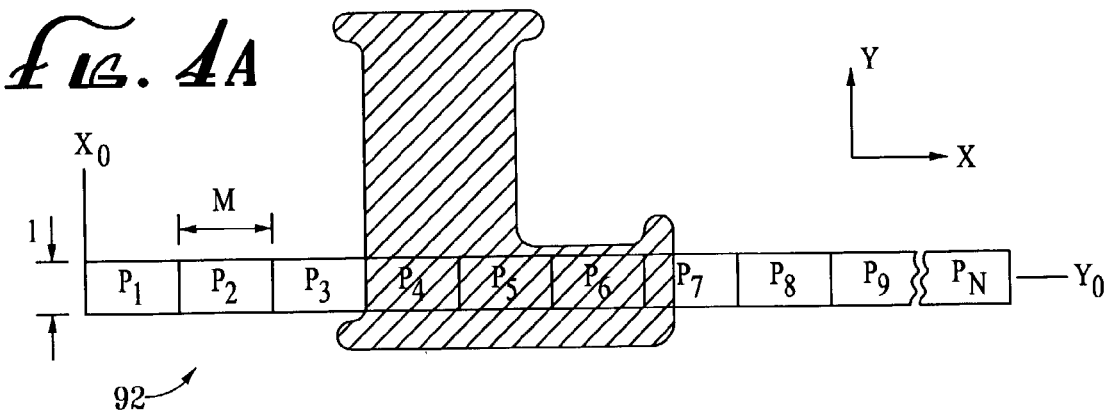
FIG. 4A
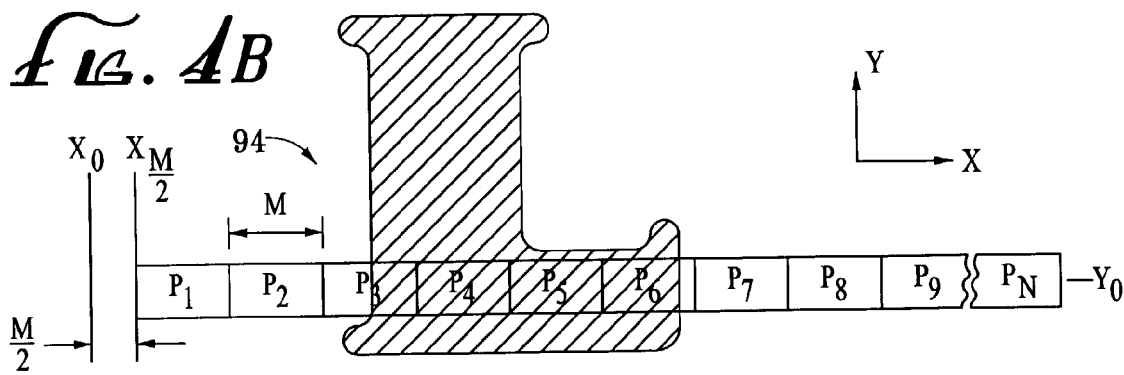
FIG. 4B
FIG. 4C
FIG. 4D

MULTIPLIED RESOLUTION SCANNER

BACKGROUND OF THE INVENTION

A. Field of the Invention

The present invention is directed to a single pass, multiplied resolution scanner having a scanning width of W, in which two carriages are mounted in a flatbed housing, with one carriage supporting at least one mirror oriented at 45° from the longitudinal axis of the scanner, and with the other carriage supporting a linear sensor, such as a charge-coupled device (CCD) having a "n" pixel elements, and a reduction lens assembly that can resolve 2n/W in both the longitudinal (length) and transverse (width) directions by alternating the stepping of the two carriages only in the longitudinal direction in W/2n increments to shift the object image on the CCD by one-half the CCD pixel element's center to center distance in both the longitudinal and transverse directions.

B. Description of the Prior Art

Flatbed scanners and techniques for increasing the resolution for such scanners are known. However, known resolution increase techniques require multiple passes of the scanner head over the entire image and require computer-implemented software to stitch together scanned images of parts of a given scan line scanned during different scan passes.

OBJECTS AND SUMMARY OF THE INVENTION

It is an object of the present invention to provide a single pass, multiplied resolution scanner in which a conventional, flatbed scanner may be modified to increase the resolution by providing for multiple scans along a single scan line, through use of two independently movable carriages, one of which supports a linear sensor and reduction lens assembly, and the other of which supports at least one mirror oriented at an angle 45° from the direction of movement of the carriages along the longitudinal axis of the scanner.

It is a further object of the present invention to provide a flatbed scanner having a single pass, multiplied resolution capability through use of dual, independently movable carriages.

BRIEF DESCRIPTION OF THE DRAWINGS

FIGS. 3A, 3B, 3C and 3D illustrate a simplified top, cross-sectional view of the FIG. 1 embodiment shown in two scanning positions for twice reading each of two scan lines y and y+1.

FIGS. 4A, 4B, 4C and 4D illustrate a schematic representation showing how the increased resolution is achieved through use of the FIG. 1 embodiment.

DESCRIPTION OF EMBODIMENTS OF THE INVENTION

Figure 1:
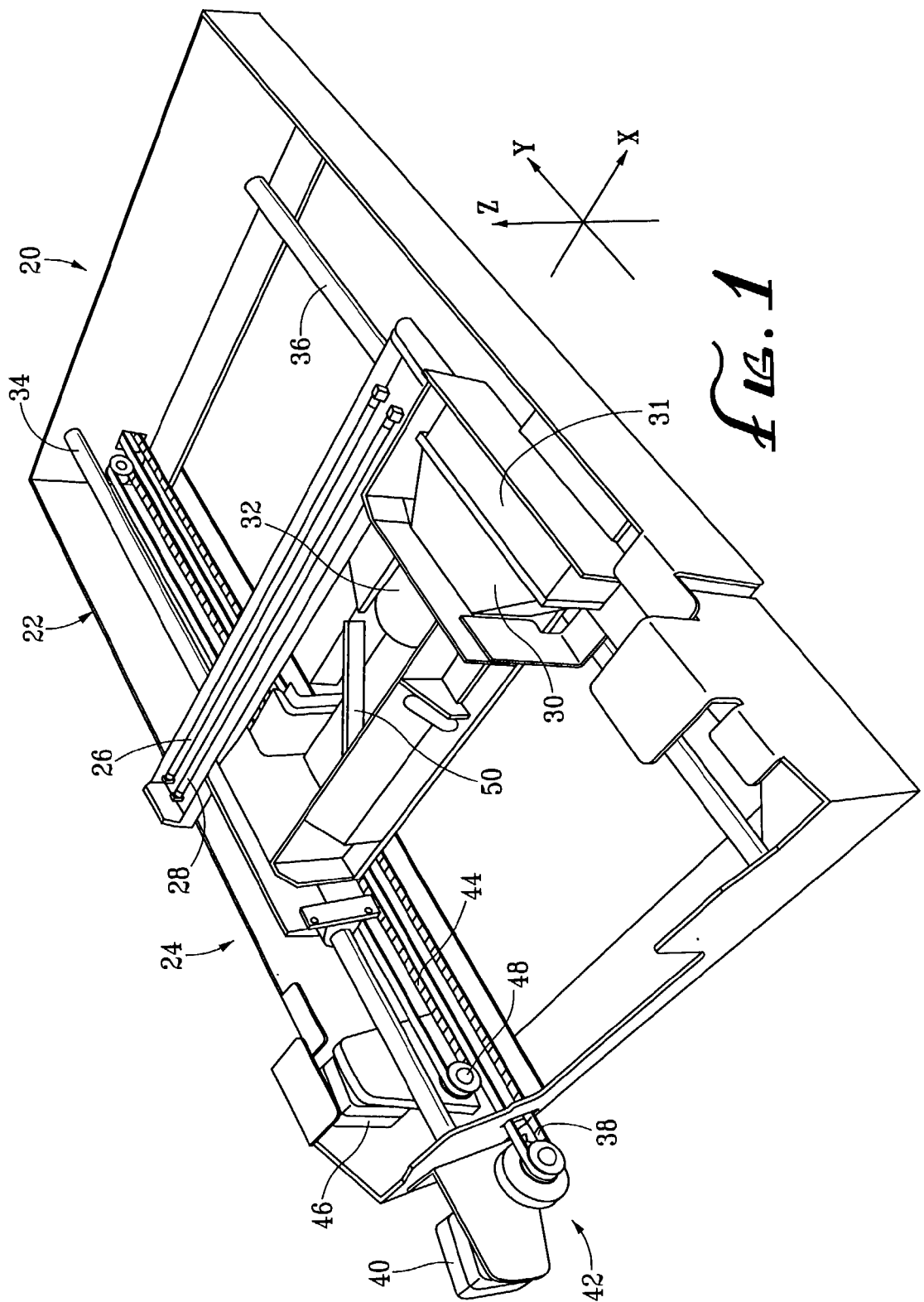
FIG. 1 is a top, side perspective view of a first embodiment of the present invention.

Referring to FIGS. 1–10, one embodiment to the present invention will be described. In general, the present invention is directed to a single pass, multiplied resolution, flatbed scanner. Flatbed scanners are well known, and generally include a housing on which a glass platen is positioned, and, typically, a hinged cover positioned over the platen. Conventional flatbed scanners also typically include a movable carriage internal to the housing. During operation of the scanner the carriage reciprocates back and forth along the length of the scanner on one or more rails, through operation of a stepper motor operatively connected to an endless belt that engages the carriage. Flatbed scanners may be for reflective or transmissive materials scanning, or, in some applications, are configured to provide both reflective and transmissive materials scanning. Typically, the material to be scanned is placed on the platen, a light source is directed to the material to be scanned and an image along a line Y of the material is then reflected into the housing, and, through use of one or more mirrors, is reflected to a lens which then focuses the image of line Y onto a linear sensor. The sensor is typically a CCD array having n pixels. Also, as is conventional, the direction of movement back and forth from one end of the scanner to the other is generally referred to as along the length, longitudinal axis or the Y direction. The direction along the width or transverse axis of the scanner is generally referred to as the X direction. As the carriage moves along the Y direction, each scan line Y, Y+1, Y+2 ... is scanned, with each scan line Y+i, i=0,1,2 ... including segments X, X+1, X+2 ... throughout the width, W of the scanner to project an image on and along the entire width of n pixels of the linear sensor. The number of sensor pixels divided by the width of the scanner is generally referred to as the resolution of the scanner in (n/W) pixels per unit length, usually abbreviated as ppi when the length unit is in inches. The scanning movement of the carriage in the Y direction from one end of the scanner to the other is called a scan pass.

Typically, a conventional flatbed scanner includes a single carriage upon which the CCD is mounted. Also, the single carriage also supports the focusing lens, and one or more mirrors, as it reciprocates back and forth along the interior of the scanner housing during operation. These conventional structures then provide for a predetermined resolution according to the number of pixels in the linear sensor and the width of each line Y, and the length of each increment of movement from a line Y to the next line, Y+1 along the length of the scanner. For example, a CCD having 2000 pixels reading an 8 inches line will provide 250 pixels per inch, or 250 ppi. In some conventional designs, a scan pass of half of a scanner width is made, with a second scan pass being made of the other half of the scanner width, to achieve a slightly less than twice the original resolution. In such designs, computer implemented software is then required to stitch the information representative of the scan of the first half of the line Y to the information representative of the scan of the second half of the scan line Y and loss of resolution due to the overlap of pixels in the stitch area. Those attempts have proved difficult to achieve satisfactory results in practice.

In accordance with the principles of the present invention, a flatbed scanner is adapted to accommodate two carriages, each of which is independently movable through use of an independent stepper motor and endless belt. In accordance with the principles of this invention, the CCD, or other linear sensor having n pixels is positioned on a first movable carriage, and a 45° switch mirror is positioned on the second movable carriage. Although the present embodiment is described as using a CCD, other linear sensors may be used in the present invention, as other embodiments that are considered to be equivalent. A scan is then made of the line positioned at Y to fill the CCD with data, the CCD is read out, and the data from each pixel is entered into a data matrix for alternating line segments X, X+2, X+4 ... along the scan line Y. Then, the first carriage, containing the linear sensor, is moved a distance equal to W/2 n in the longitudinal direction. Due to presence of the 45° switch mirror on the second carriage, line segments X+1, X+3, X+5 ... of the same line Y are focused onto the CCD. The CCD is again exposed and filled with data, the CCD is read out, and the data from each pixel is entered into a data matrix of n pixels of alternate segments X+1, X+3, X+5 ... located along scan line Y. Thus, for each line Y and for each CCD resolution, a resolution of twice the original resolution may be achieved.

Figure 8:
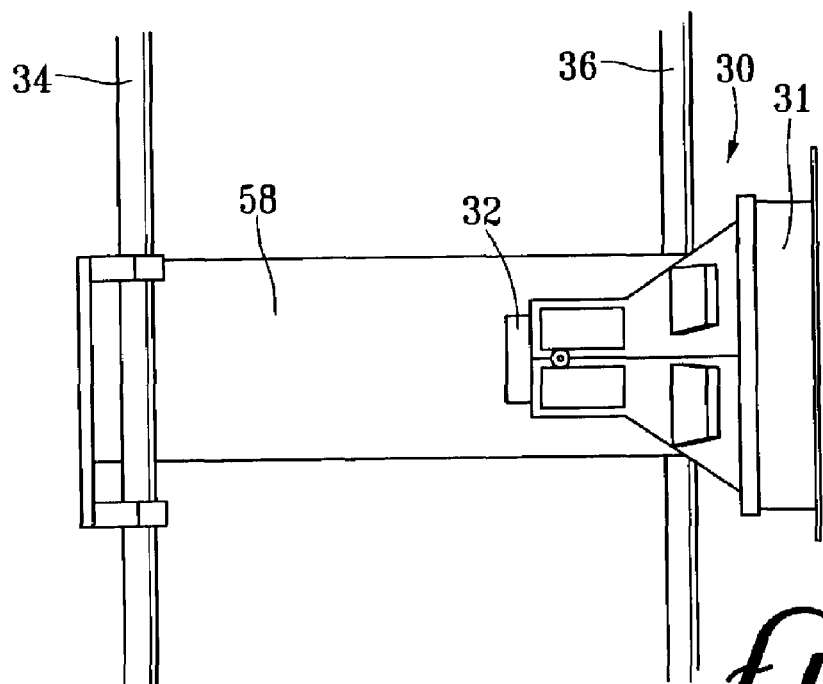
FIG. 8 is a partial, top view of the lower carriage 58 of the FIG. 1 embodiment.
Figure 9:
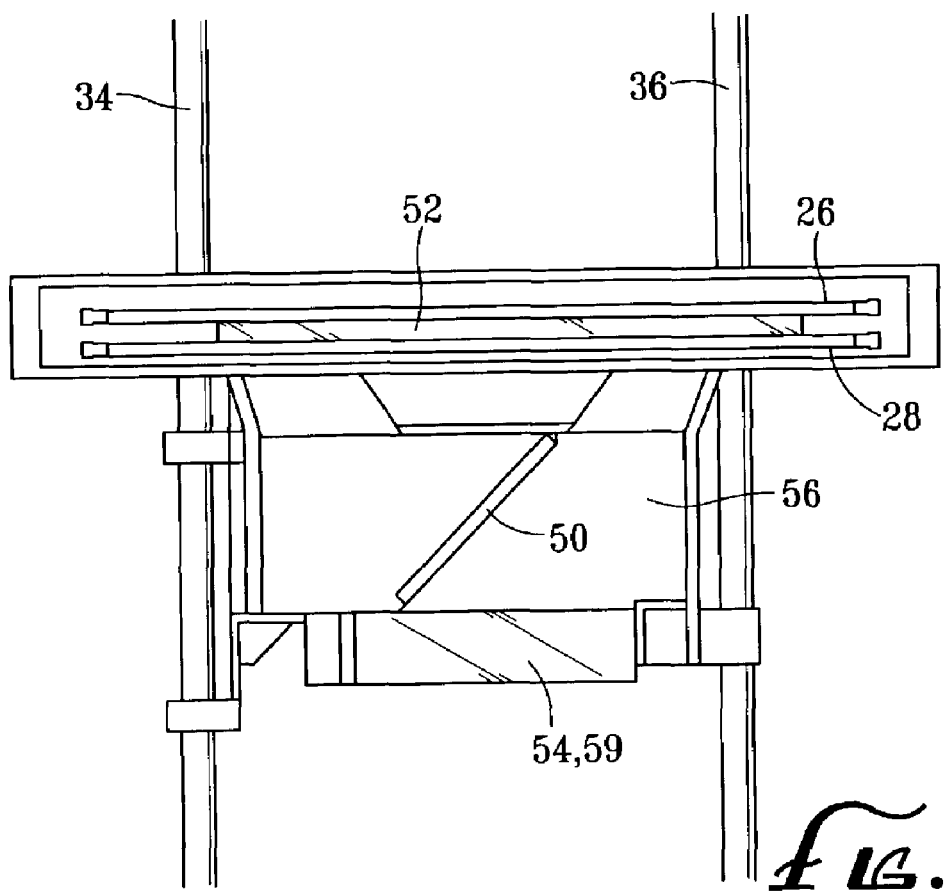
FIG. 9 is a top, partial view of the upper carriage 56 of the FIG. 1 embodiment.

Referring to FIG. 1, a partial, perspective view of selected components of a first embodiment scanner 20 is shown, with housing 22 including a dual carriage assembly 24, first rail 34 and second rail 36 with the rails extending longitudinally along the "Y" axis of the scanner the second, or lower rail 36 is positioned at a height on the "Z" axis lower than that of the first or upper rail 34. The dual carriage scanner assembly 24 includes a linear sensor CCD array, with housing 30, a lens 32 and CCD array 31. The CCD housing 30 and lens 32 are positioned on a lower carriage 58 of the assembly 24 as shown in FIGS. 2 and 8, and the mirror 50 is positioned on upper carriage 56 of the assembly 24 as shown in FIGS. 2 and 9.

Conventional light source 26 and conventional light source 28 are also shown, as part of upper scanner carriage 56. The lower carriage 58 is attached to and reciprocated along the length of the scanner through use of lower endless belt 38, which in turn is driven by conventional lower stepper motor 40 through a gearing and axle assembly, generally shown at 42. Upper scanner carriage 56 is attached to and reciprocated within the housing 22 along its length by conventional upper endless belt 44 which in turn is actuated by conventional upper stepper motor 46 through a conventional upper gearing and axle assembly, generally shown at 48.

Although other components may be used within the spirit and scope of the present invention to form other embodiments, the FIG. 1 embodiment preferably employs a conventional 72 millimeter long 3-color CCD having 8,000 pixels per color, manufactured by Kodak, as its part No. KL-8013A. The motor driver is, preferably, Toshiba part No. TA8435H. The preferred stepper motor is Teco part No. 4H4018X1604. The preferred lens is Kyocera part No. 1425, Type A, Part No. RVH1000Y having an object to image reduction ration of 8 inches:72 millimeter or 2.822:1. Also, the preferred gear assembly includes a first gear, 22T manufactured by Microtek as its part No. 147-4115; a second gear, Microtek gear 88T/22T, part No. 147-4116; and a third gear, Microtek gear 110T/Pully 25P, Model No. 147-4117 to provide the gear ratios of one embodiment. The preferred endless belts for the present invention are conventional bare back model 650MXL belts, part No. 515T80. The preferred microprocessor used in the present invention is AMD part No. N80C186-20. With the above described components, each of the stepper motors provides 200 steps per revolution, with the gearing and belt assembly providing for 0.0005 inch per step of linear movement along the Y axis. The four mirrors used in the first embodiment of the present invention are, preferably, Part Nos. 147-003245, 147-003229, 147-003230, and 147-003246 mirrors manufactured by Tatguguchi. The preferred lens focuses the image of an 8 inch wide scan line on to the preferred 8000 pixels CCD and yields, without use of the shifting multiplication principles of the present invention, a resolution of 1,000 ppi. With a first carriage movement of 0.0005 inch per step, as accomplished with the first embodiment of the present invention, a multiplied resolution of 2000 ppi is achieved.

Figure 2:
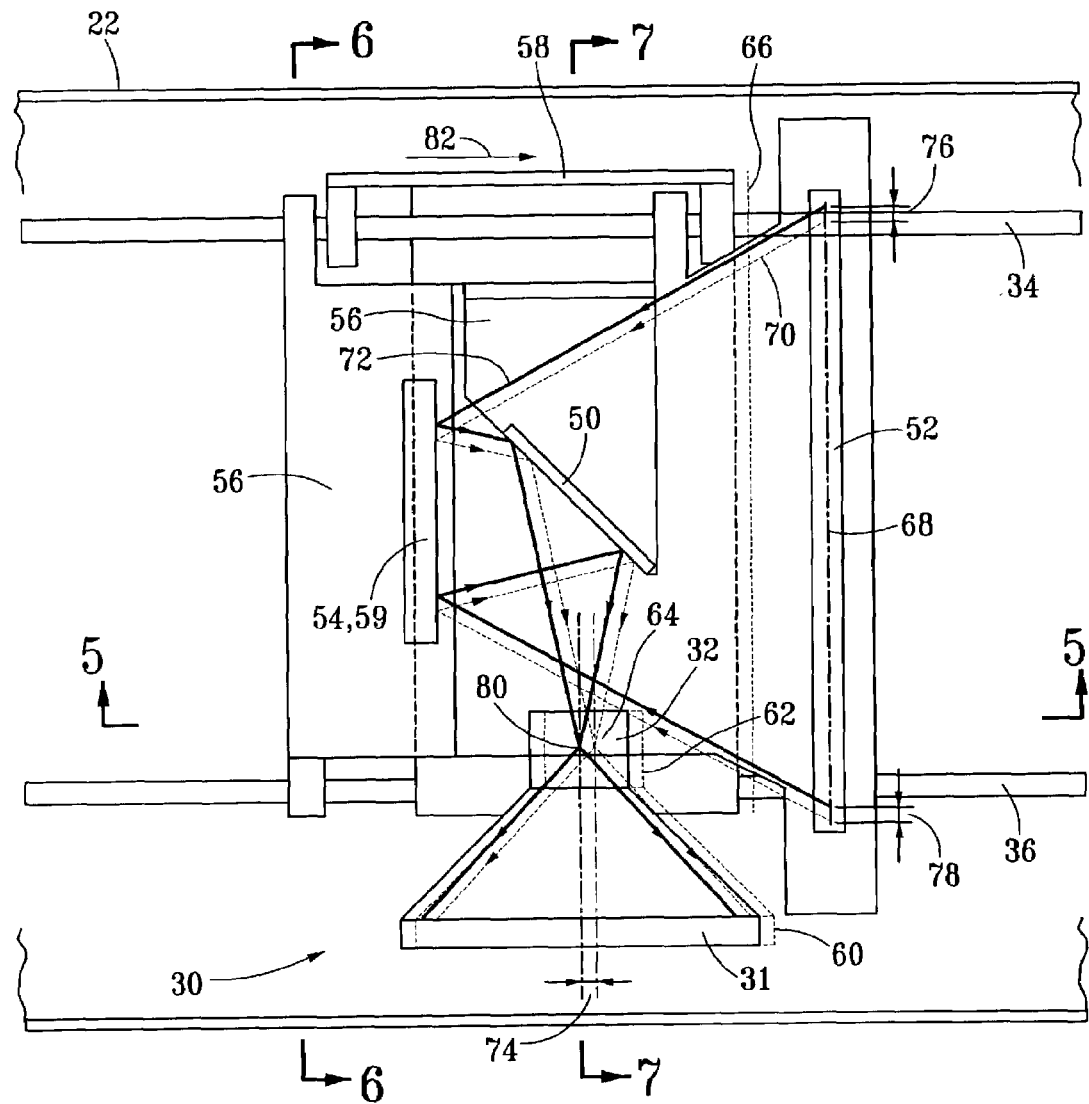
FIG. 2 is a top, cross-sectional view of the FIG. 1 scanner, shown in two positions for twice reading a single scan line Y, with one position shown in solid lines and the second position shown in dashed lines.

Referring to FIG. 2, a top view showing two positions of the dual scanner carriages for a dual scan of a single line Y, will be described. Positioned along the rails 34 and 36 inside of the housing 22 is upper carriage (second movable carriage) 56 on which the 45° switch mirror 50 is positioned. Also positioned along the rails 34 and 36, at a lower position, is scanner carriage (first movable carriage) 58. Positioned on the lower scanner carriage 58 is the lens 32, CCD housing 30 and CCD array 31. FIG. 8 shows the lower carriage 58 together with the lens 32, CCD housing 30 and CCD array 31 positioned thereon in relation to the rails 34 and 36. FIG. 9 shows the upper carriage 56 positioned on the rails 34 and 36, together with its mirrors 50, 52, 54 and 59, as well as the lights 26 and 28. Also shown in FIG. 2 is first mirror 52 and scan line Y. In the first scan of scan line Y, light is reflected from first mirror 52 to second mirror 54, shown at 72. The light is then reflected down to third mirror 59, and over to fourth mirror 50, and then to the lens 32, shown at 80. In the second scan of scan line Y, the lower carriage 58 has been advanced an increment equal to ½ M, where M=W/n, shown at 66 and 74. This incremental advance results in different parts of the scan line Y being focused on the CCD array 31. This incrementally different scan line is represented also at 76, 78 and 66, with the difference also representing the distance ½ M. The path of reflected light for the second mirror is represented with dotted lines, beginning at 70, and ending at the new position of the center point of the lens, shown at 64. The new position of the lens and CCD array is shown at 62, and 60, respectively.

Figure 10:
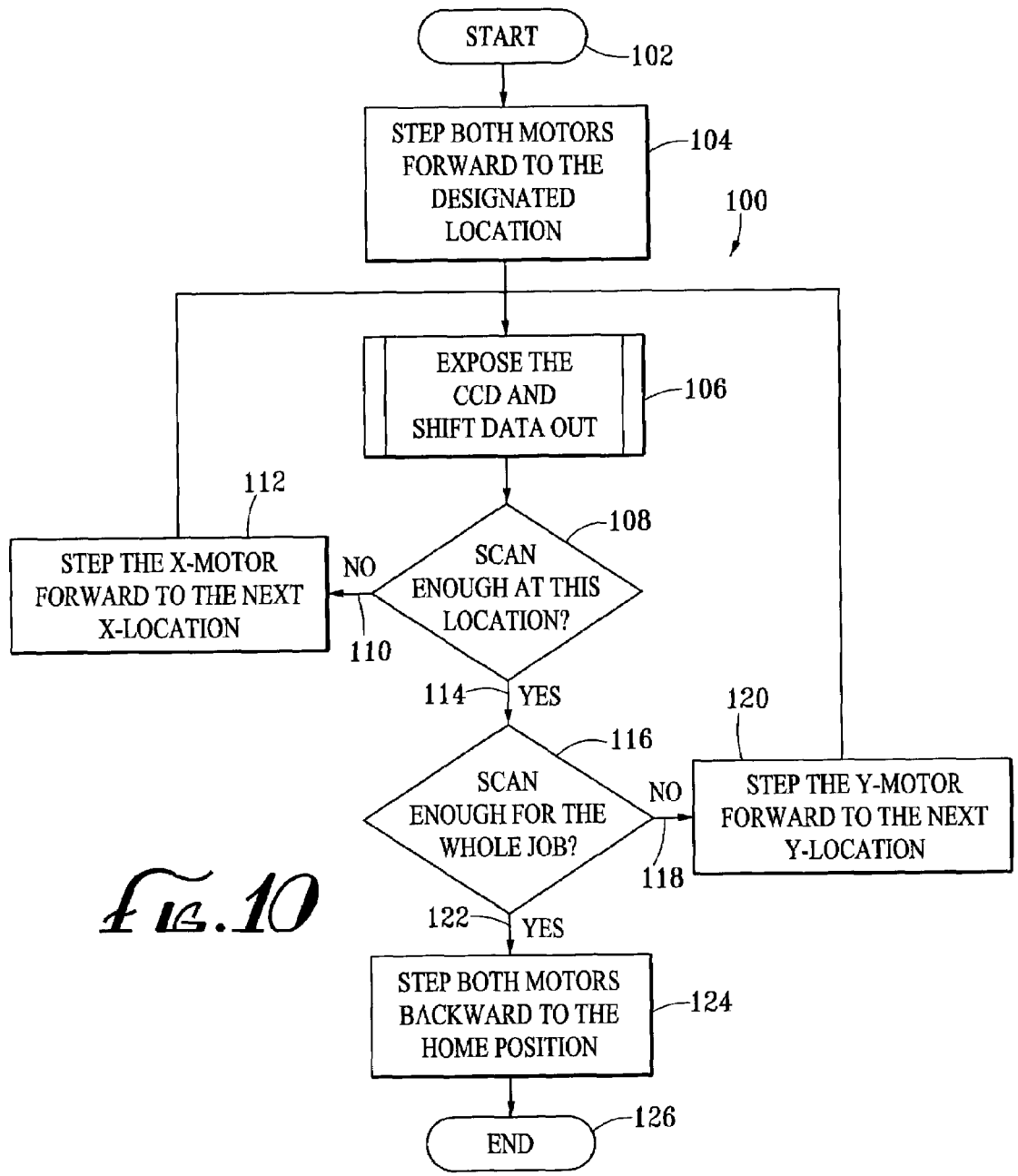
FIG. 10 is a functional block diagram of a computer implemented software routine for operation of the FIG. 1 embodiment.

FIG. 10 is a control flow block diagram 100 representing operational steps of the computer-implemented software used in the microprocessor for the present invention. The software routine 100 is activated by pushing the start control 102 which causes both stepper motors to step forward to a pre-designated location at 104. Next, the scanner exposes one line Y, the CCD fills with data and the data is shifted out of the CCD at 106. Next, the system is interrogated to determine whether enough data has been scanned in line Y at step 108. If not enough data has been scanned for line Y then the lower, X stepper motor 40 is stepped forward a distance of M/2 to the next position at 112. Then the Y line is exposed again, for data in the next series of X positions so that the actions at 106 are again performed, i.e., the CCD is filled with the data and the data is then shifted out of the CCD. Again, the system is interrogated at 108, and, when enough data has been scanned for all X positions on the line Y, the answer to the interrogation is yes, at 114.

If the answer to the next interrogation 116 is no, then at 118, the Y stepper motor, upper motor 46 is activated and is stepped forward at 120 a distance of M/2 to scan the next line, Y+1. Then the actions at 106 are again performed, where the line Y+1 is scanned for a first time. Next, for line Y+1, the sequence of steps at 108, 110, 112 is repeated until the system determines that enough of the line Y+1 has been scanned so that all of the X positions along the line Y+1 have been scanned, in which time the system moves from 114 to 116 and the process is repeated at step 118, 120 and so on until all of the material to be scanned has been scanned at step 122, i.e., the scanning for the whole job is completed. At that point, both stepper motors will be stepped backward to the home position at 124 and the operation will end at 126.

Operation of a Scanner of the Present Invention

With reference to various of the figures, the operation of an embodiment of the present invention will be described.

Figure 5:
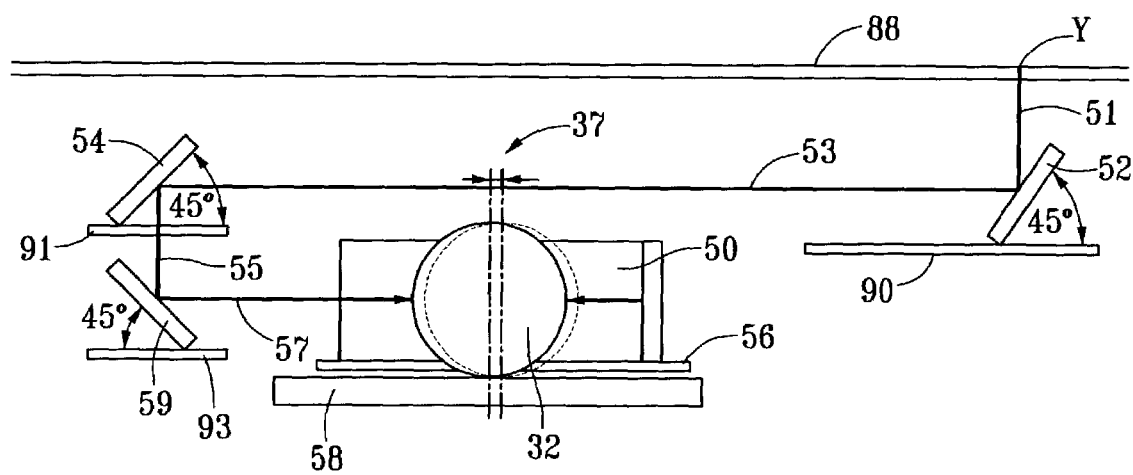
FIG. 5 is a cross-sectional view of the FIG. 1 embodiment taken along line 5—5 of FIG. 2.

A flatbed scanner of the present invention as described above with respect to the FIG. 1 embodiment is operated for reflective scanning of an object placed on the platen 88 as shown in FIG. 5. The material to be scanned, not shown, may be a sheet of text, or an image such as a photograph. The scanning may be black and white for line art, i.e. text, or grayscale or color, the scanning of which are accomplished in accordance with conventional techniques. Also, with reference to FIG. 5, a single line, Y is to be scanned. As shown in FIG. 5, the line Y would extend in the direction of down into and out of the page of the drawing. The various X positions, or segments along the line Y would then also extend down into the page and out of the page along line Y. The CCD array 31 and the lens 32 are positioned on the lower carriage 58 which is positioned along the height, or Z axis of the scanner as shown in FIG. 5 at 58. The first mirror 52 is positioned at a 45° angle on platform 90 of upper carriage 56, and below the platen 88 as shown in FIG. 5. First mirror 52 reflects light from the scanned material on the platen 88 across the carriage to second mirror 54 along path segment 53. Second mirror 54 is positioned on platform 91 of upper carriage 56 at the same height as mirror 52, has a 45° angle, and is positioned to reflect light to third mirror 59 as shown in FIG. 5. Third mirror 59 is positioned on surface 93 of upper carriage 56 below second mirror 54 and is also positioned at a 45° angle to reflect light to fourth, or switch mirror 50. The positioning of mirrors 52, 54 and 59 provides for the path of light reflected from the scanned material, in line Y to travel down in segment 51 to mirror 52, then be reflected and travel in path segment 53 to mirror 54, where it is reflected down to mirror 59 along path segment 55. Light reflected from mirror 59 then travels along light path segment 57 to mirror 50, which is positioned on the floor of carriage 56. Switch mirror 50 turns the light path of line Y 90° so that line Y now extends left and right across the page. Light reflected from mirror 50 travels through lens 32 to expose the CCD array 31. Operation of the lower stepper motor 40 incrementally advances the lower carriage 58 a distance of M/2, as represented at 37 in FIG. 5. In the presently described embodiment, every line Y, Y+1, Y+2 . . . is scanned twice, so as to multiply, or increase the resolution of the scanner to be twice that of the conventional scanner without the dual carriage assembly of the present invention. The system software interrogation is activated to determine that a single scan of the line Y is insufficient to pass from step 108 to step 116 as shown in FIG. 10. Thus, at 110, the system will be interrogated and will determine that not enough data has been scanned during the first scan of line Y. Data scanned in this first scan is schematically shown in FIG. 4A, a scan of the letter "L", with "M" representing the pixel width. The stepper motor 40 would then be energized to step the lower carriage 58 forward a distance of M/2 so that a second scan of the line Y would provide a scan of data points as shown in FIG. 4B. The data collected in each scan of line Y is represented in FIG. 4C at 96 and 97 by the stylized pixel elements bearing grey scale data values from 0 (white) to 10 (black) as shown, respectively, for the scans of the "L" in FIGS. 4A and 4B. The combined data matrix at 98 for line Y is then shown schematically in FIG. 4D, where each data segment P1A, P1B, P2A, P2B . . . PnA, PnB, corresponds to a distance of M/2 along line Y. For a given line Y, then a resolution of 2n/W is achieved. For example, data in a single pixel representing 0.0005 inch is achieved with a sensor having a pixel pitch of 0.0010 inch. This operation is also schematically shown in FIGS. 3A and 3B, with the first scan of line Y yielding data for data matrix 98 positions X, X+2, X+4, . . . and the second scan yielding data for data matrix 98 positions X+1, X+3, X+5 and so on along the line Y, as shown schematically in FIG. 4D.

As shown in FIG. 5, the second scan of the line Y would again produce an image reflected down from the platen to first mirror 52 in segment 51. The path of light would also be reflected from first mirror 52 along line 53 to second mirror 54 just as in the previous scan. Similarly, the light reflected from second mirror 54 along path 55 would again be reflected off of third mirror 59 along path 57 to fourth, switch mirror 50 and thence to the lens 32 and CCD array 31. However, because the lower carriage 58 had been moved a distance equal to M/2, the CCD array 31 would then be in receipt of image data shifted a distance of M/2 as shown in FIG. 4B at 94 and as schematically represented in FIG. 4C at 97. As shown in FIG. 5, the initial position of the lens 32 is shown as a circle with a solid line. With the lower carriage 58 having been moved from a first position to a second position with the difference corresponding to M/2, it may be seen that the second exposure of line Y at 106 will produce scan data as shown in FIG. 4B at 94 and in FIG. 4C at 97. With the scanner set and adapted to double the resolution, from n/W to 2n/W the second pass through 106, as shown in FIG. 10, will yield a "YES" answer to the interrogation at 108, so that at 114, the system will then perform the interrogation 116 on whether enough data has been scanned for the whole job. In the case of scanning the first line Y, the answer to the interrogation at 116 will be no, and the stepper motor 46 will be energized to step the upper carriage 56 to advance the carrier to the next line, Y+1. The exposure 106 will be performed for line Y+1, as described above with respect to the first scan of the line Y. Then, at 108, the system will determine that not enough data has been scanned for line Y+1, and will cause the stepper motor 40, to advance the lower carriage platform 58 a distance of M/2 to perform a second scan of the line Y+1, as described above, with respect to the second scan of the line Y. The two scans of the two lines Y and Y+1 are shown in FIGS. 3A, 3B, 3C and 3D.

The process is repeated for two scans of each of the lines Y, Y+1, Y+2 . . . of the object (material to be scanned) until the entire object has been scanned, at which point the interrogation at 116 will result in an answer yes, at 122 and both stepper motors will be stepped backwards to the home position. The scan operation will then end at 126.

This series of two scans for each of representative scan lines Y and Y+1 is shown in FIG. 3. In the upper right of the figure a series of lines is shown, with line Y and line Y+1 identified and, with line Y being scanned first. FIG. 3A shows the relative positions of the upper platform 56 and the lower platform 58 once both stepper motors have been energized at 104 and placed both platforms in the pre-designated first location to read scan line Y. In this position, the scan line Y is read, corresponding to 106 as shown in FIG. 10 to generate data as shown, for example, in FIG. 4C at 96 from CCD pixel elements P1 to Pn, which is assigned to the data matrix at 98 as shown in FIG. 4D at X, X+2, X+4, and so on. In moving from the top position, "read scan line Y", in FIG. 3A to the second position, "read scan line Y" in FIG. 3B, it may be seen that the lower platform 58 carrying lens 32 and CCD array 31 has been moved to the right along the Y axis of the scanner a distance of M/2. This corresponds to 112 shown in FIG. 10 where the X stepper motor 40 has been energized to move the platform 58 forward. The path of light reflected to the CCD array 31 is shown in dashed lines in FIG. 3B, and this movement of the lower platform 58 of a distance M/2 being shown at 33. Once the scan line Y has been twice scanned, the Y stepper motor 46 is energized, to move the upper platform 56 forward along the Y axis of the scanner, at 120 shown in FIG. 10, to read or scan the next scan line Y+1, as shown in FIG. 3C. The distance that the Y stepper motor moves the upper carriage is ½ M, shown at 35 on FIG. 3C so that the line Y+1 is now in position to be read. The data collected for each scan line Y, Y+1, Y+2 and so on is entered into the data matrix at 98 and is assigned an extent of ½ M along the Y axis in assembling the complete scanned material image. Because the incremental shift along the Y axis of the scanner between adjacent scan lines is only ½ M, a resolution of 2/M=2n/W is achieved along the Y axis, i.e., the resolution is twice as great as 1/(pixel line pitch M), for example, a resolution of 2000 ppi is achieved with a sensor having a pixel line pitch of 0.0010 inch. The line Y+1 is then scanned at 106 and 108, 110 and 112 are repeated, whereby the X stepper motor 40 again advances the lower carriage 58 one increment, i.e., M/2 in this example, shown at 37, to position the scanner to read the scan line Y+1 a second time, thereby collecting sufficient data for line Y+1 to double the resolution along the X axis or transverse dimension of the scanner, as schematically shown in FIG. 4C.

Figure 6:
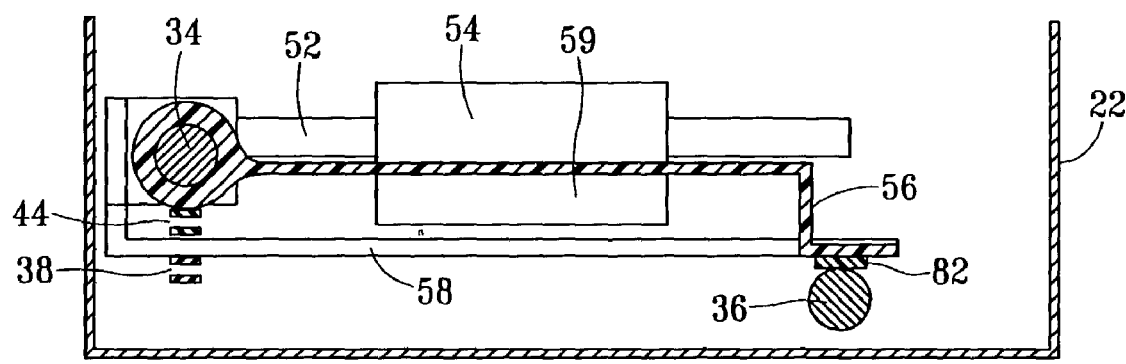
FIG. 6 is a cross-sectional view of the FIG. 1 embodiment taken along line 6—6 of FIG. 2.
Figure 7:
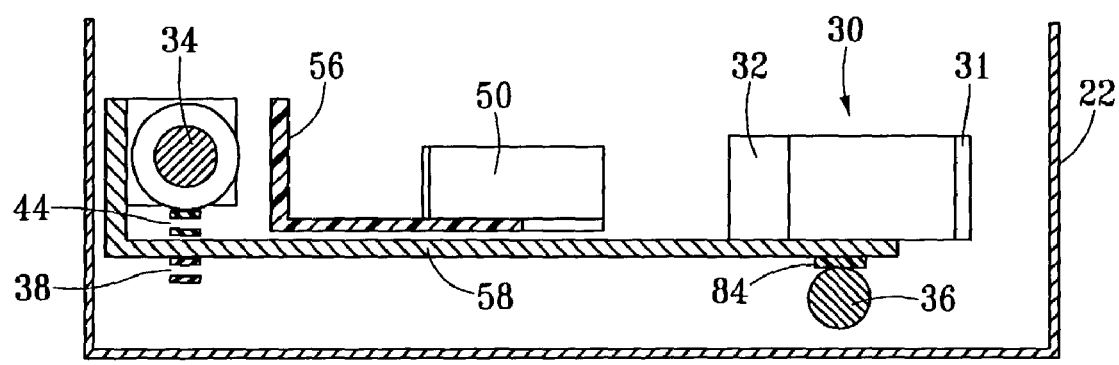
FIG. 7 is a cross-sectional view of the FIG. 1 embodiment taken along line 7—7 of FIG. 2.

As shown in FIG. 6 and FIG. 7, the lower carriage 58 includes load bearing surface or platform which is moveably positioned along upper rail 34, in a conventional manner so as to slide along rail 34. At its opposite end this platform of the lower carriage is attached to a strip of Teflon, shown at 84, so that it can be supported by, but slide easily along lower rail 36. The second, upper carriage 56 includes, preferably, the light source(s), and the mirrors 52, 54, 59 and 50 that are used to direct light from the object to be scanned to the CCD. The upper carriage is also moveably positioned along rail 34 and has a corresponding Teflon bearing strip 82, so that it can slide easily along lower rail 36 as shown in FIG. 6.

In the operation of a conventional scanner, a single line Y along the transverse axis, that is, perpendicular to the longitudinal axis of the scanner is scanned. Nominally, an 8 inches long line Y is scanned into an 8,000 element CCD, results in a single scan resolution of 1,000 ppi (pixels per inch).

In the present invention, the two carriages 56, 58 are aligned so that line Y of 8 inches in length is scanned into the 8,000 pixels CCD sensor twice as shown above, thus providing a resolution of 2,000 ppi. After a first scan of line Y, the lower carriage 58 is then advanced 0.0005 inches so that the image focused on the camera lens remains line Y, but the image is offset by 0.0005 inches in the transverse or width direction, i.e., M/2, thus yielding a total resolution of 2,000 ppi along the X axis. In essence, the result of the first scan is that every other X pixel element of the data matrix 98 for line Y is filled in positions X, X+2, X+4 and so on. Once the lower carriage 58 has been advanced by one 0.0005 inch increment along the longitudinal or Y axis, then the same line Y is scanned, to fill the data matrix 98 positions X+1, X+3, X+5, and so on.

In this way the resolution of the scanner can be doubled in both the longitudinal and transverse directions to 2,000 ppi using a CCD sensor that in conventional scanner designs results in a scan resolution of only 1,000 ppi. In similar fashion, multiples of increases in resolution can be obtained by increasing the number of increments of movement of the lower carriage for each movement of the upper carriage, and appropriately reducing the distance of advance of each movement of the lower carriage and each movement of the upper mirror carriage.

It will be understood that certain features and sub-combinations are of utility and may be employed without reference to other features and sub-combinations as they are outlined within the description above and within the claims appended hereto. While the preferred embodiments and application of the invention have been described, it is apparent to those skilled in the art that the objects and features of the present invention are only limited as set forth in the claims appended hereto.

The invention claimed is:

1. A flatbed scanner comprising:
   a housing having a length extending along a first axis y, having a scan width, W extending along a second axis x and a height extending along a third axis z, the y, x, and z axes being orthogonal to each other;
   a platen positioned along said housing;
   a first rail positioned inside the housing and extending along the y axis;
   a second rail positioned inside of the housing, parallel to the first rail and extending along the y axis;
   a first carriage mounted on at least one of the first and second rails;
   a second carriage mounted on at least one of the first and second rails;
   a first motor operatively connected to the first carriage and adapted to reciprocate the first carriage along the y axis;
   a second motor operatively connected to the second carriage and adapted to reciprocate the second carriage along the y axis;
   a first mirror, a second mirror, a third mirror and a fourth mirror positioned on said first carriage, the fourth minor positioned 45° to the y axis, said first, second, third and fourth mirrors adapted and positioned to provide a path of light from along a scan line of said platen to a lens;
   said lens and an optical sensor having n pixels positioned on said second carriage; and,
   computer implemented software adapted to cause the first carriage to advance in increments of W/2n, and for each advance of W/2n of the first carriage to cause the second carriage to advance a distance of W/2n, whereby the resolution of said scanner is increased to 2n/W.

2. A multiplied resolution flatbed scanner comprising:
   a housing having a platen positioned at one surface of the housing and at a first height; the housing containing a first moveable carriage positioned at a second height under the platen and moveable along a length dimension of the housing, and the housing containing a second moveable carriage at a third height under the platen and moveable along the length dimension;

a charge-coupled device (CCD) sensor and lens assembly positioned on the first moveable carriage, the CCD having n pixels extending across a scan width of W inches in a width dimension of the housing;

a mirror assembly including at least one mirror positioned on the second moveable carriage inside of the housing and at a 45 degree angle from a line extending along the length dimension of the housing;

the first moveable carriage and the second moveable carriage being moveable independently of each other along the length dimension;

the mirror assembly and the CCD and lens assembly adapted to focus an image onto the CCD sensor, the image being of a scan line Y of n segments from material placed on the platen;

the first moveable carriage adapted to be moveable in increments of W/2n inch; and the second moveable carriage adapted to be moveable in increments of W/2n inch so that for each read of a scan line Y, two reads of all segments of X along the scan line Y are taken, with each segment of X having a width of W/2n and each line Y having a height of W/2n, whereby a resolution of 2n pixels/W inch results.

3. A method of providing a multiplied resolution scan of material placed on a platen of a flatbed scanner comprising:

providing a flatbed scanner having a charge-coupled device sensor of n pixels and a scan width of W inches;

providing two independently moveable carriages in the scanner, each carriage having the capability of incremental advancement of W/2n;

providing a lens and mirror assembly including a mirror oriented at a 45-degree angle from a line extending along the direction of movement of the carriages;

placing the material on the platen;

establishing a pre-designated starting position for each of the two carriages;

exposing a first scan line Y for a first time and collecting scan data;

moving the second carriage a distance of W/2n exposing the first scan line Y a second time and collecting scan data;

moving the first carriage a distance of W/2n;

exposing a second scan line Y+1 for a first time and collecting scan data;

moving the second carriage a distance of W/2n;

exposing the second scan line for the second time and collecting scan data; and repeating the process of moving the first carriage a distance of W/2n, and collecting scan data from two times exposing each subsequent scan line Y until all of the material has been scanned to provide a scanned image of the material with a resolution of 2n pixels per W inch.

* * * * *